United States Patent
Katayama

(10) Patent No.: US 11,682,188 B2
(45) Date of Patent: Jun. 20, 2023

(54) IMAGE PROCESSING APPARATUS AND COMPUTER-READABLE STORAGE MEDIUM FOR STORING SCREEN PROCESSING PROGRAM

(71) Applicant: FUJITSU LIMITED, Kawasaki (JP)

(72) Inventor: Kentaro Katayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 185 days.

(21) Appl. No.: 17/322,953

(22) Filed: May 18, 2021

(65) Prior Publication Data
US 2022/0051044 A1    Feb. 17, 2022

(30) Foreign Application Priority Data
Aug. 14, 2020   (JP) .............................. JP2020-136951

(51) Int. Cl.
| | |
|---|---|
| *G06V 10/44* | (2022.01) |
| *G06T 7/292* | (2017.01) |
| *G06T 7/277* | (2017.01) |
| *G06V 20/00* | (2022.01) |

(52) U.S. Cl.
CPC .............. *G06V 10/44* (2022.01); *G06T 7/277* (2017.01); *G06T 7/292* (2017.01); *G06V 20/00* (2022.01)

(58) Field of Classification Search
CPC .......... G06T 7/277; G06T 7/246; G06T 7/70; G06T 7/143; G06T 7/292; G06K 9/6278
See application file for complete search history.

(56) References Cited

U.S. PATENT DOCUMENTS

| | | | |
|---|---|---|---|
| 2009/0030865 A1* | 1/2009 | Sawada .................. | G06F 18/256 706/46 |
| 2014/0177923 A1* | 6/2014 | Oh ........................ | G06V 10/255 382/103 |
| 2015/0278601 A1* | 10/2015 | Nagamine ............... | G06T 7/277 382/103 |

(Continued)

FOREIGN PATENT DOCUMENTS

| | | | | |
|---|---|---|---|---|
| CN | 104574442 A | * | 4/2015 | ............. G06T 7/277 |
| CN | 110648355 A | * | 1/2020 | ............. G06T 7/277 |
| JP | 2008059224 A | * | 3/2008 | |

(Continued)

*Primary Examiner* — Ian L Lemieux
*Assistant Examiner* — Woo C Rhim
(74) *Attorney, Agent, or Firm* — Fujitsu Patent Center

(57) ABSTRACT

An image processing apparatus is configured to perform processing of detecting an object by using a predetermined number of sample points referred to as particles, the processing including: executing a detection processing configured to calculate a weight for each of the particles, and detect the object by using the calculated weights; and executing a resampling processing configured to assign a particle number to each of the predetermined number of particles, calculate, for each particle, a comparative value by multiplying an average of the weights of the predetermined number of particles by the particle number, calculate, for each particle, a cumulative weight by adding the particle's own weight to the weights of all the particles assigned with the respective particle numbers smaller than the particle's own particle number, and perform a reselection process that executes reselection on the particles of all the particle numbers.

8 Claims, 9 Drawing Sheets

(56) References Cited

U.S. PATENT DOCUMENTS

| | | | | |
|---|---|---|---|---|
| 2016/0055648 A1* | 2/2016 | Liu | ........................ | H04N 23/80 |
| | | | | 382/103 |
| 2016/0071286 A1* | 3/2016 | Kawarada | .............. | G05B 15/02 |
| | | | | 348/169 |

FOREIGN PATENT DOCUMENTS

| | | | | | |
|---|---|---|---|---|---|
| JP | 2010122734 | A | * | 6/2010 | |
| JP | 4664838 | B2 | * | 4/2011 | |
| JP | 5116605 | B2 | * | 1/2013 | ............. G06F 17/18 |
| JP | 2013-092895 | A | | 5/2013 | |
| JP | 2013092895 | A | * | 5/2013 | ............. G06F 17/18 |
| JP | 2015-191261 | A | | 11/2015 | |
| JP | 2018077807 | A | * | 5/2018 | ......... G06K 9/00369 |
| KR | 20120048958 | A | * | 5/2012 | ......... G01N 15/0211 |
| KR | 101165335 | B1 | * | 7/2012 | |
| KR | 101470367 | B1 | * | 12/2014 | |
| KR | 101514242 | B1 | * | 5/2015 | ............. G06T 7/208 |
| KR | 102136111 | B1 | * | 7/2020 | |
| WO | WO-2008039217 | A1 | * | 4/2008 | ......... G06F 17/5009 |
| WO | WO-2010073432 | A1 | * | 7/2010 | ......... G06K 9/00369 |
| WO | WO-2011035470 | A1 | * | 3/2011 | ............. G06T 7/208 |
| WO | WO-2011102072 | A1 | * | 8/2011 | ............. G06T 7/208 |

\* cited by examiner

FIG. 7

| PARTICLE NUMBER (idx) | PARTICLE INFORMATION | | | CUMULATIVE WEIGHT | COMPARATIVE VALUE (AVERAGE WEIGHT × idx) | SELECTED NEXT PARTICLE NUMBER |
|---|---|---|---|---|---|---|
| | X COORDINATE | Y COORDINATE | WEIGHT | | | |
| 1 | 130 | 770 | 0 | 0 | 5.7 | 4 |
| 2 | 250 | 80 | 0 | 0 | 11.4 | 4 |
| 3 | 1800 | 970 | 0 | 0 | 17.1 | 7 |
| 4 | 1000 | 800 | 15 | 15 | 22.8 | 7 |
| 5 | 1100 | 430 | 0 | 15 | 28.5 | 7 |
| 6 | 1845 | 390 | 0 | 15 | 34.2 | 7 |
| 7 | 800 | 600 | 35 | 50 | 39.9 | 7 |
| 8 | 760 | 380 | 7 | 57 | 45.6 | 7 |
| 9 | 1200 | 60 | 0 | 57 | 51.3 | 8 |
| 10 | 1400 | 700 | 0 | 57 | 57 | 8 |

IMAGE PROCESSING APPARATUS AND COMPUTER-READABLE STORAGE MEDIUM FOR STORING SCREEN PROCESSING PROGRAM

CROSS-REFERENCE TO RELATED APPLICATION

This application is based upon and claims the benefit of priority of the prior Japanese Patent Application No. 2020-136951, filed on Aug. 14, 2020, the entire contents of which are incorporated herein by reference.

FIELD

The embodiments discussed herein are related to an image processing apparatus and a non-transitory computer-readable storage medium storing a screen processing program.

BACKGROUND

Nowadays, there are object tracking systems that analyze image data taken by cameras installed, for example, around roads, detect an object such as a vehicle, and track the object in continuous pieces of image data.

In the object tracking systems, as a method for detecting an object from image data, a particle filter, which is a type of sequential Monte Carlo, is used in some cases.

The particle filter is a method for processing an image in which the object is detected by preparing a plurality of sample points referred to as particles, calculating a weight for each particle based on the likelihood with respect to the image data, reselecting (resampling) the particles in accordance with the weight, and gradually concentrating the particles to be selected to the object. Regarding the particle filter, as the number of particles to be selected increases, detection accuracy improves.

Techniques related to the particle filter are disclosed in the following.

Examples of the related art include Japanese Laid-open Patent Publication Nos. 2013-092895 and 2015-191261.

However, in the particle filter, when the number of particles to be selected increases, a load of the image analysis process increases. This may increase processing time. For example, in some cases, matrix control is performed in the particle filter. In the matrix control, for example, a selector of N (number of particles)-to-1 is provided for each particle to perform processing. Thus, when the number of particles increases, the computational burden in the selector significantly increases, and the throughput of the whole system gets degraded.

According to an aspect of the embodiments disclosed below, there is provided a solution to reduce the amount of computational burden (e.g., a processing load) in a particle filter.

SUMMARY

According to an aspect of the embodiments, an image processing apparatus includes: a memory; and a processor coupled to the memory, the processor being configured to perform processing of detecting an object by using a particle filter and by using a predetermined number of sample points referred to as particles, the processing including: executing a detection processing configured to calculate a weight for each of the particles in accordance with a likelihood of the particle, and detect the object by using the calculated weights; and executing a resampling processing configured to assign a particle number to each of the predetermined number of particles such that the predetermined number of particles are assigned with the respective particle numbers sequentially from 1, calculate, for each of the particles, a comparative value obtained by multiplying an average of the weights of the predetermined number of particles by the particle number, calculate, for each of the particles, a cumulative weight obtained by adding the particle's own weight to the weights of all the particles assigned with the respective particle numbers smaller than the particle's own particle number, and perform a reselection process that executes, on the particles of all the particle numbers, reselection which sets, as the particle after the reselection of the particle number of a first particle, a third particle assigned with a smallest particle number out of second particles the cumulative weights of which are greater than or equal to the comparative value of the first particle.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of particle information and calculated values used in the resampling process S40;

DESCRIPTION OF EMBODIMENT(S)

First Embodiment

A first embodiment will be described.

Configuration Example of Object Tracking System 10

Figure 1:
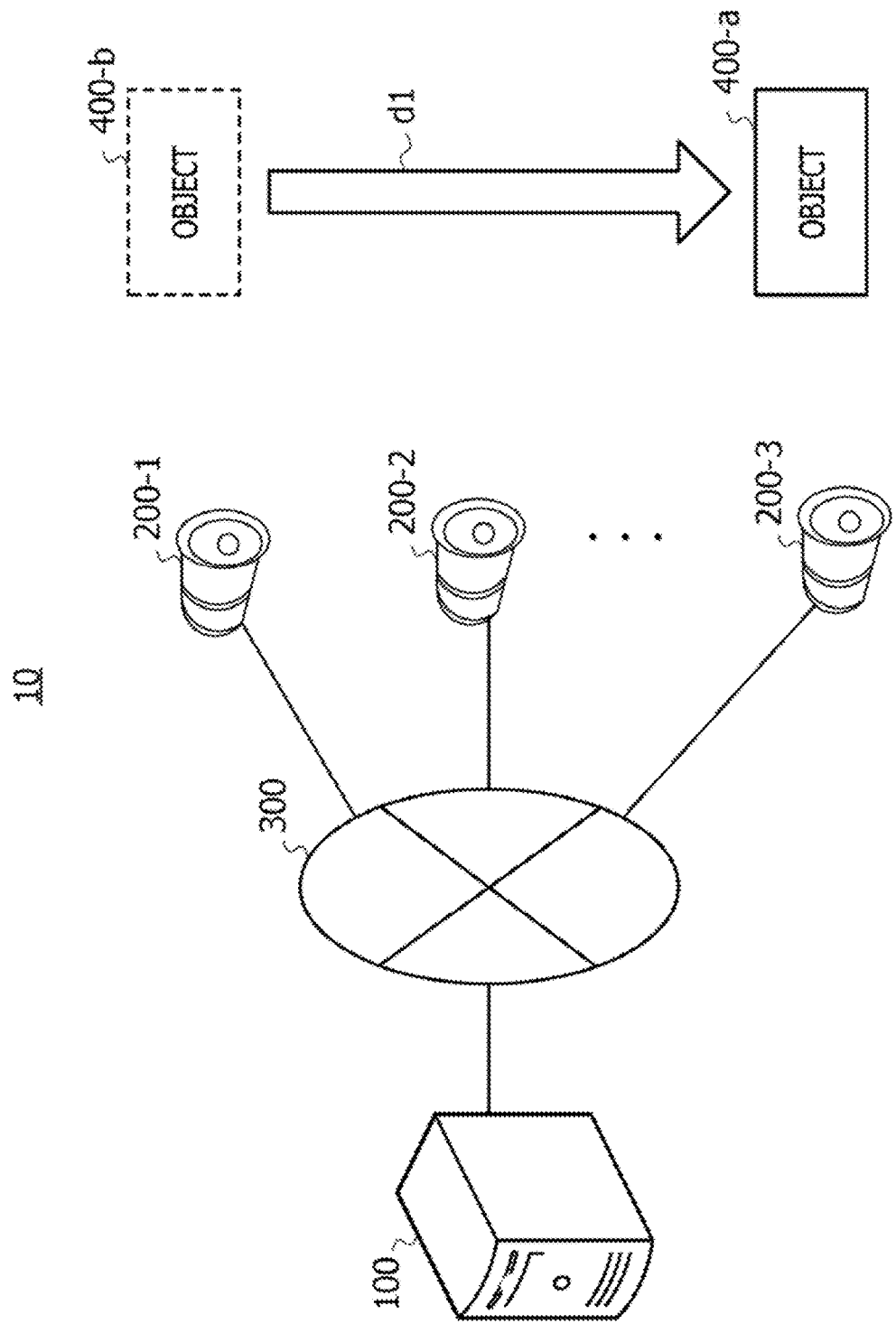
FIG. 1 illustrates a configuration example of an object tracking system 10.

FIG. 1 illustrates a configuration example of an object tracking system 10. The object tracking system 10 includes an image processing apparatus 100, cameras 200-1 to 200-$n$ (n is a natural number), a network 300, and an object 400. The object tracking system 10 is a system that analyzes image data of photographic images taken by the cameras 200-1 to 200-$n$ and tracks the object 400 imaged in the photographic images.

The cameras 200-1 to 200-$n$ (hereinafter referred to as the cameras 200 in some cases) are image taking devices for taking images of an object. The cameras 200 are, for example, a surveillance cameras installed in, for example, roads, houses, and so forth. The cameras 200 are coupled to the image processing apparatus 100 via the network 300 and transmit the image data to the image processing apparatus 100. For example, the cameras 200 periodically take images.

The object 400 is an object to be detected by image processing. The object 400 is, for example, a vehicle moving on a road. For example, the object 400 moves from the position of an object 400-*b* in an arrow di direction and, after the elapse of a predetermined time period, moves to the position of an object 400-*a*.

The image processing apparatus 100 is, for example, a computer or a server machine that analyzes image data obtained from the cameras 200 and detects the object 400 in the image data. The image processing apparatus 100 uses, for example, a particle filter in the analysis of the image data.

The network 300 is, for example, the Internet. The network may be a local network or a wireless network.

In the object tracking system 10, the cameras 200 take images of the object 400 that is moving. However, the object 400 is not necessarily imaged by all the cameras 200-1 to 200-*n*. Accordingly, based on, for example, the moving speed of the object, the image processing apparatus 100 may select a camera 200 the image data from which is to be analyzed. The image processing apparatus 100 analyzes the image data transmitted from the camera 200 and detects the object 400. Furthermore, the image processing apparatus 100 predicts a camera 200 that will take an image of the object 400 next based on the moving direction and the moving speed of the object and detects the object 400 in the image data of this camera 200. In this way, the image processing apparatus 100 is able to track the object 400.

Configuration Example of the Image Processing Apparatus 100

Figure 2:
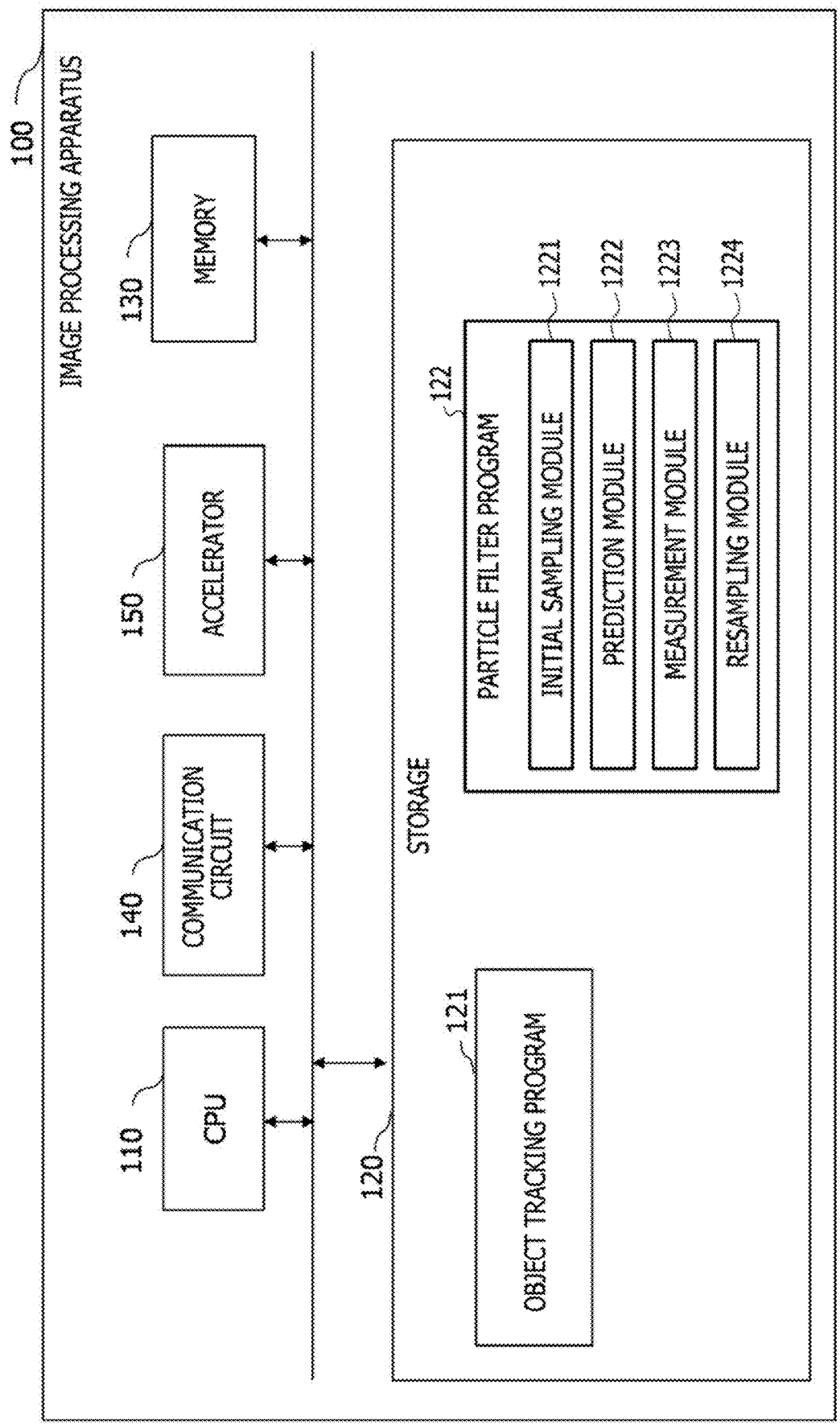
FIG. 2 is a diagram illustrating a configuration example of an image processing apparatus 100.

FIG. 2 is a diagram illustrating a configuration example of the image processing apparatus 100. The image processing apparatus 100 includes a central processing unit (CPU) 110, a storage 120, memory 130, a communication circuit 140, and an accelerator 150.

The storage 120 is an auxiliary storage device such as a flash memory, a hard disk drive (HDD), or a solid-state drive (SSD) that stores programs and data. The storage 120 stores an object tracking program 121 and a particle filter program 122.

The memory 130 is an area to which the programs stored in the storage 120 are loaded. The memory 130 may be used as an area in which the programs store data.

The CPU 110 is a processor that loads the programs stored in the storage 120 to the memory 130 and executes the loaded programs to construct units and realize processes.

The communication circuit 140 is a circuit that communicates with the cameras 200 via the network 300. The communication circuit 140 is, for example, a network interface card (NIC). The communication circuit 140 may be coupled to the network 300 in a wireless manner or a wired manner.

The accelerator 150 is, for example, a graphics processing unit (GPU) or a field-programmable gate array (FPGA) that performs specific processing in accordance with an instruction from the CPU no. The accelerator 150 is a hardware accelerator and performs, for example, image processing, arithmetic processing, or the like. According to the first embodiment, image processing including image analysis is performed.

The CPU 110 executes the object tracking program 121 to construct an object tracking unit and perform an object tracking process. The object tracking process is a process of obtaining image data taken by the cameras 200 and, by using the image data, detecting (tracking) the object 400. For example, a particle filter is used to detect an object.

The CPU 110 executes the particle filter program 122 to construct a detection unit, a resampling unit, and a control unit and perform a particle filter process. The particle filter process is a process of executing the particle filter used in detecting the object from the image data. The particle filter process includes an initial sampling process, a prediction process, a measurement process, and a resampling process.

The CPU 110 executes an initial sampling module 1221 of the particle filter program 122 to construct an initial sampling unit and perform the initial sampling process. The initial sampling process is a process of randomly selecting particles that are to be used as samples at the start of execution of the particle filter.

The CPU 110 executes a prediction module 1222 of the particle filter program 122 to construct the detection unit and perform the prediction process. The prediction process is a process of predicting or determining the next positions of the selected particles and moving the particles.

The CPU 110 executes a measurement module 1223 of the particle filter program 122 to construct the detection unit and perform the measurement process. The measurement process is a process of detecting the object by calculating the weights from the likelihoods of the particles.

The CPU 110 executes a resampling module 1224 of the particle filter program 122 to construct the resampling unit and perform the resampling process. The resampling process is a process of reselecting particles (particles used for the next measurement process and the next prediction process) based on the weights of the particles (already selected particles, the particles with which the measurement process has been performed).

The CPU 110 causes the accelerator 150 to execute the particle filter process as well as the initial sampling process, the prediction process, the measurement process, and the resampling process included in the particle filter process. The detection unit, the resampling unit, and the initial sampling unit may be constructed by, for example, execution of the program by the accelerator 150.

About Image Analysis Process

The image processing apparatus 100 executes the image analysis process in detection of the object in object tracking. The image analysis process is performed, for example, by using the particle filter.

Figure 3:
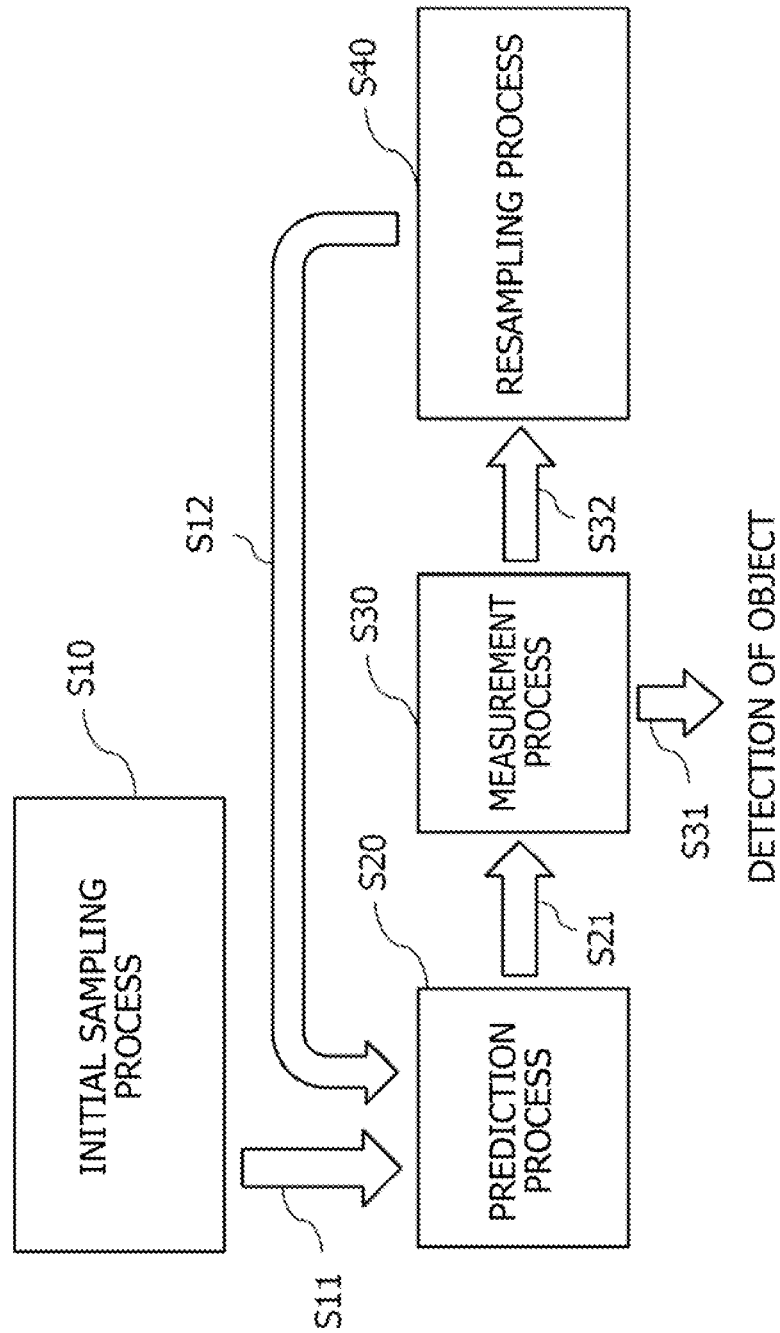
FIG. 3 illustrates an example of an image analysis process S1.

FIG. 3 illustrates an example of an image analysis process S1. The image analysis process S1 includes an initial sampling process S10, a prediction process S20, a measurement process S30, and a resampling process S40.

The initial sampling process S10 is a process of selecting a predetermined number of the particles for the first time when the object is detected from certain image data. In the initial sampling process S10, a predetermined number of the particles are selected at random.

The prediction process S20 is a process in which particles (S11) selected in the initial sampling process S10 or particles (S12) selected in the resampling process S40 are input to predict the next position of each particle and move the particle. In the case of a plurality of consecutive pieces of image data, the next position of the particle is the position of this particle in the next piece of image data. For example, the image processing apparatus 100 guesses the moving speed, the moving direction, and so forth from a past moving state of the particle to predict the position of the particle in the next piece of image data.

In the case of a single piece of image data, the next position of the particle is the position of the particle to be used as the next sample. The image processing apparatus 100 is able to search for a more appropriate weight by moving the particle to be used as the sample. The weight will be explained in description of the measurement process S30.

The measurement process S30 calculates the respective likelihoods from the particles and observational data by using the result of the prediction process S20 (S21). A normalized weight is calculated based on the calculated corresponding likelihood. The weight is a numerical value corresponding to the likelihood of the particle and indicates that, as the weight increases, the possibility of existence of this particle at the position of the object increases.

In the measurement process S30, the image processing apparatus 100 detects the object in accordance with, for example, the weights of the particles and the degree of concentration of the particles to be used as the samples (how highly concentrated the particles are). For example, in the case where the particles are highly concentrated in the angle of view corresponding to the size of the object, the image processing apparatus 100 determines that the object is imaged at a location where the particles are positioned and detects the object (S31).

In the measurement process S30, the image processing apparatus 100 may determine that the object is not imaged (or is not able to be detected) in the image data. For example, the image processing apparatus 100 may determine that the object is not able to be detected, for example, in the case where the object is not able to be detected (particles are not focused) even when the measurement process S30 is repeated a predetermined number of times or in the case where the particles are equally focused at a plurality of locations.

The resampling process S40 is a process of reselecting the particles to be used as the samples by using the result of the measurement process S30 (S32). In the resampling process S40, the image processing apparatus 100 moves the particles in accordance with the weights calculated in the measurement process S30. For example, the image processing apparatus 100 deletes the particles having a smaller weight than a predetermined value and distributes the particles the number of which corresponds to the weights of the particles having a large weight that have not been deleted.

The image processing apparatus 100 repeats the resampling process S40, the prediction process S20, and the measurement process S30 to detect the object.

Figure 4:
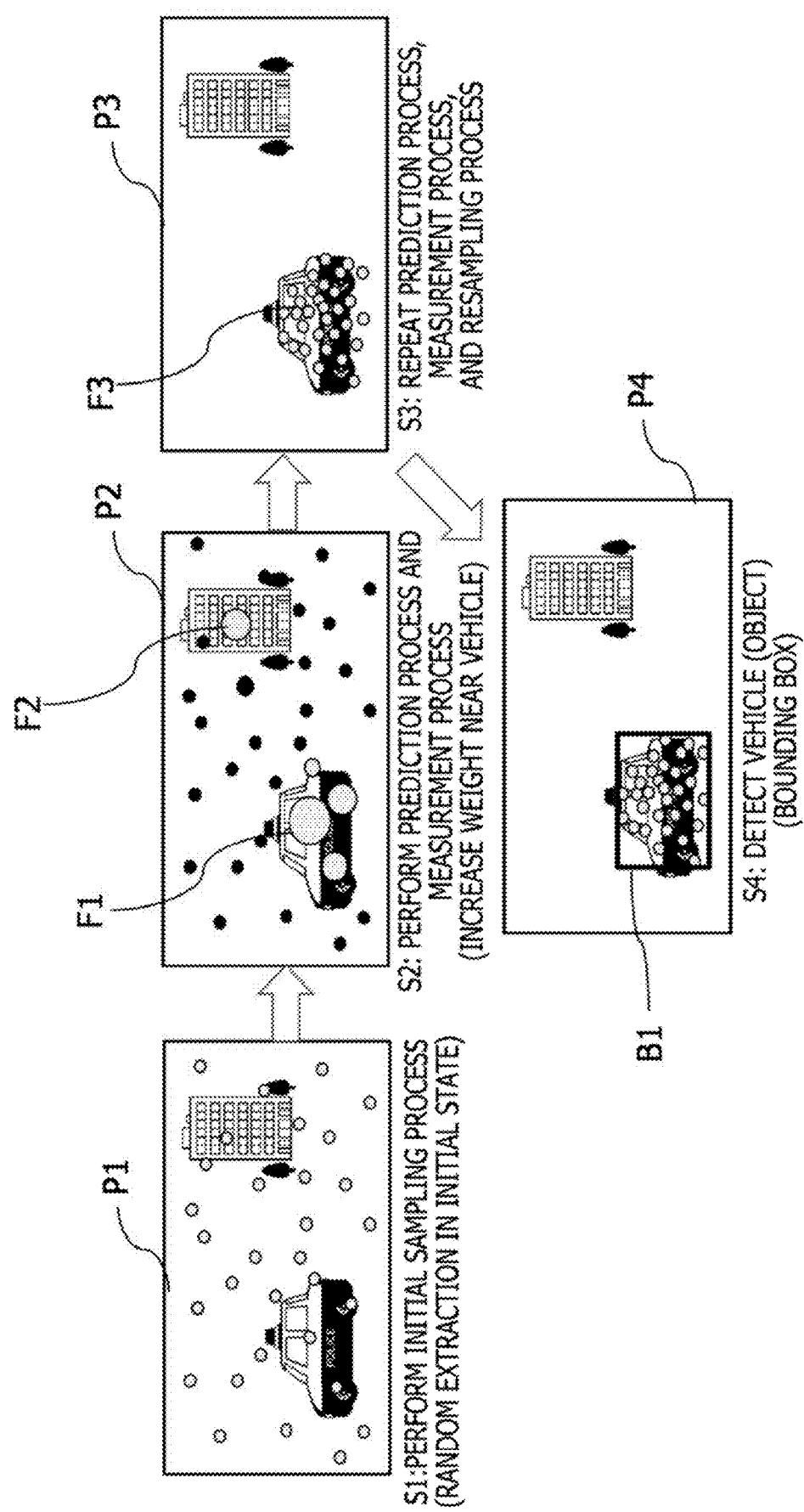
FIG. 4 illustrates an example in which an object is detected by using the image analysis process S1.

FIG. 4 illustrates an example in which the object is detected by using the image analysis process S1. Circular marks in images P1 to P4 illustrated in FIG. 4 indicate sampled particles. In FIG. 4, the images P1 to P4 are the same photographic images (image data) in which a patrol car as the object, a building, and so forth are imaged. Hereinafter, the movement of the particles will be described with reference to FIG. 4.

The image P1 is an image illustrating an example after the initial sampling process S10 has been executed. The image processing apparatus 100 executes the initial sampling process S10 to extract (select) the particles at random. In the image P1, the particles are disposed at random.

The image P2 is an image illustrating an example after the prediction process S20 and the measurement process S30 have been executed.

The image processing apparatus 100 executes the prediction process S20 and the measurement process S30 to calculate the weight of each particle. For example, the image processing apparatus 100 calculates the weight of the particle (F1) over the image of the patrol car and the weight of the particle (F2) over the image of the building as larger weights.

The image P3 is an image illustrating an example after the prediction process S20, the measurement process S30, and the resampling process S40 have been repeatedly executed. The image processing apparatus 100 repeats the prediction process S20, the measurement process S30, and the resampling process S40 to concentrate the particles to the patrol car as the object.

The image P4 is an image illustrating an example of the detection of the object. In the measurement process S30, the image processing apparatus 100 determines that the particles have been concentrated within a predetermined range (bounding box) B1 and detects the object positioned in the bounding box B1. As described above, the image processing apparatus 100 is able to detect the object by concentrating the particles to the object.

Resampling Process

Figure 5:
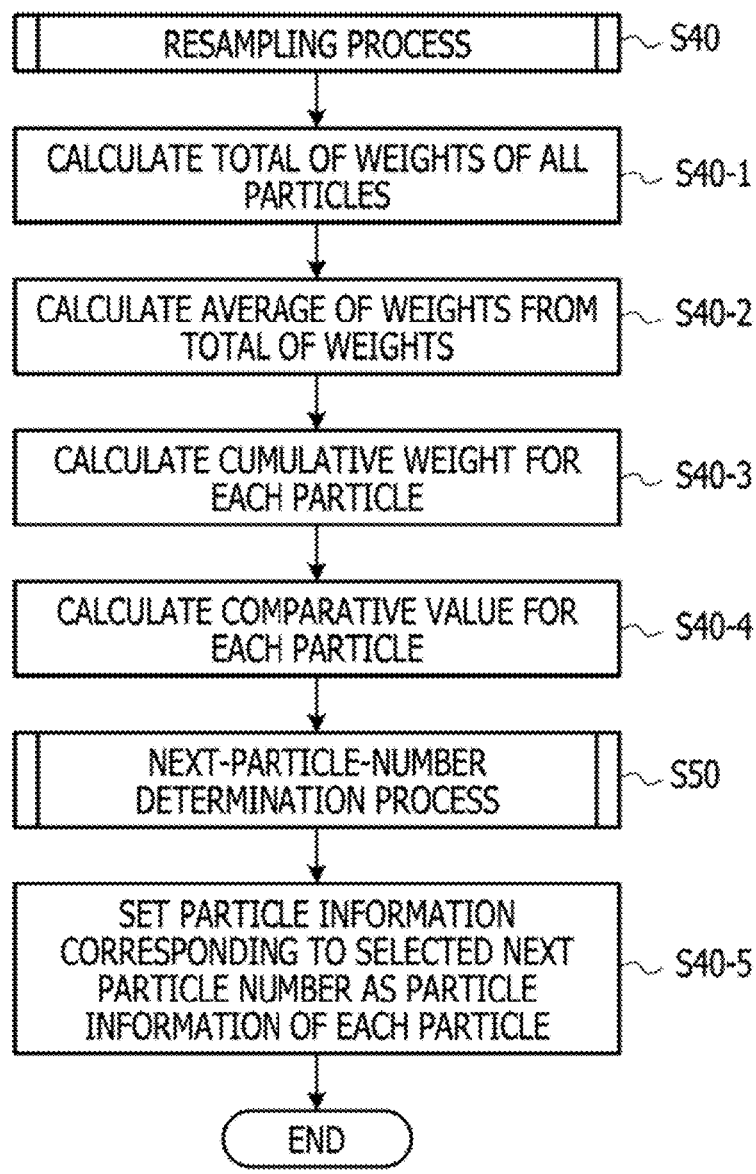
FIG. 5 illustrates an example of a process flowchart of a resampling process S40.

FIG. 5 illustrates an example of a process flowchart of the resampling process S40. The resampling process S40 according to the first embodiment is a process of performing resampling without using a large-scale selector or a pseudo-random number generation circuit.

The image processing apparatus 100 calculates the total of the weights of all the particles in the resampling process S40 (S40-1). The image processing apparatus 100 uses the weights calculated in the measurement process S30.

The image processing apparatus 100 calculates an average weight from the total of the weights (S40-2). The average weight is a numerical value obtained by dividing the total of the weights by the number of samples (the number of particles).

The image processing apparatus 100 calculates a cumulative weight for each particle (S40-3). The cumulative weight is a value obtained by accumulating the weights of the particles, and the cumulative weight of a particle number m (m is a natural number) is a value obtained by adding the respective weights of particle numbers 1 to m.

The image processing apparatus 100 calculates a comparative value for each particle (S40-4). The comparative value is a value used as a comparison target in a next-particle-number determination process S50. The comparative value is a numerical value obtained by multiplying the average weight by the particle number. The comparative value of the particle number m is a numerical value obtained by multiplying the average weight by m. In other words, the comparative value is a numerical value obtained by accumulating the average weights in a sequence from the particle number 1.

The image processing apparatus 100 performs the next-particle-number determination process that selects the next particle by using the cumulative weight and the comparative value (S50). The details of the next-particle-number determination process S50 will be described later.

The image processing apparatus 100 sets particle information corresponding to a selected next particle number determined in the next-particle-number determination process S50 as particle information of each particle (particles after resampling) number (S40-5) and ends the process.

Figure 6:
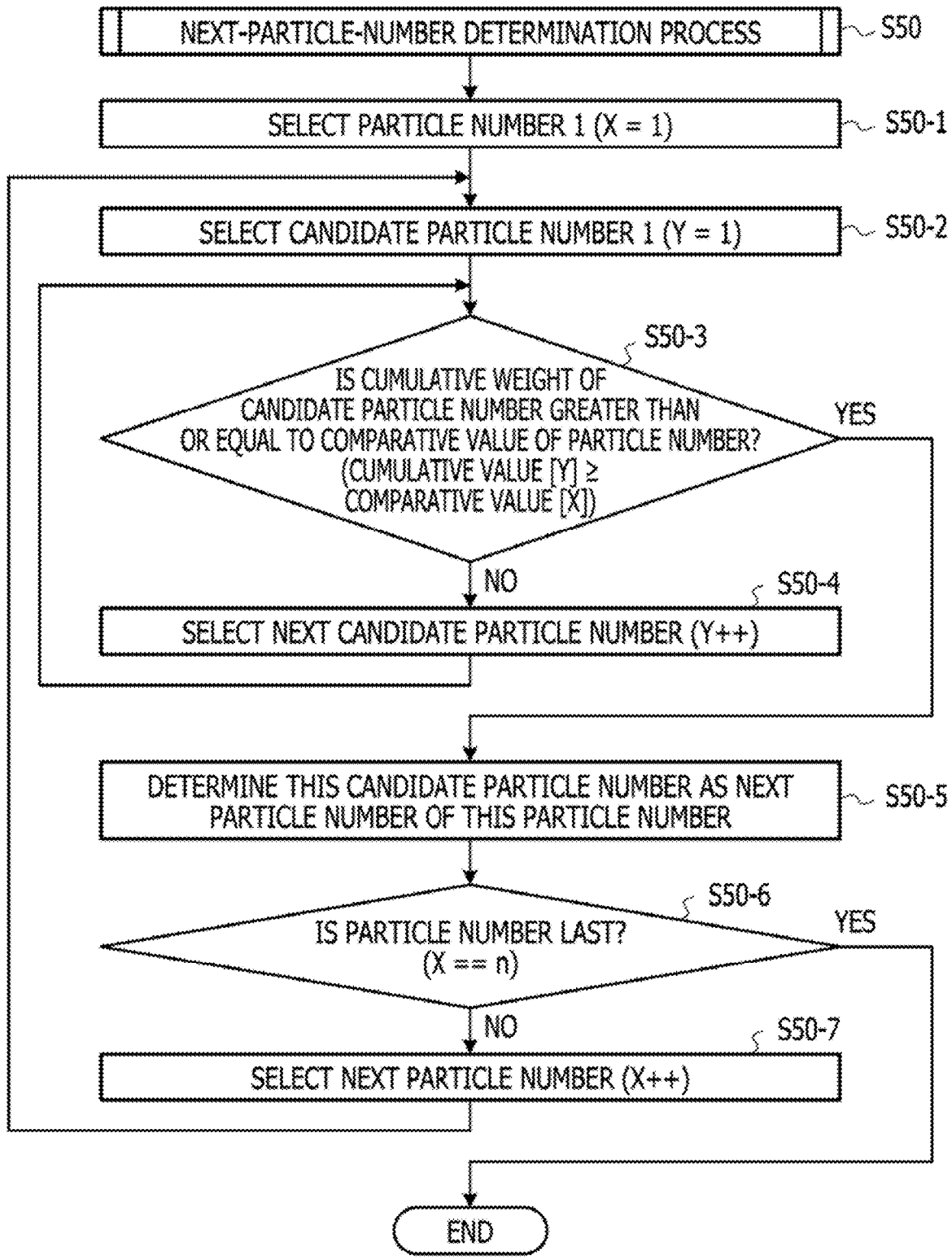
FIG. 6 illustrates an example of a process flowchart of a next-particle-number determination process S50.

FIG. 6 illustrates an example of a process flowchart of the next-particle-number determination process S50. The image processing apparatus 100 selects the particle number 1 in the next-particle-number determination process S50 (S50-1). When the particle number is represented by X, X=1 (1 is substituted for X).

The image processing apparatus 100 selects a candidate particle number 1 (S50-2). The candidate particle number is a particle number to be used as a next sampling candidate of the particle number X. When the candidate particle number is represented by Y, Y=1.

The image processing apparatus 100 determines whether the cumulative weight of the candidate particle number is greater than or equal to the comparative value of the particle number (S50-3). For example, whether the following condition is satisfied is checked: cumulative weight [Y] (cumulative weight of particle Y)≥comparative value [X] (comparative value of particle X).

When the cumulative weight of the candidate particle number is not greater than or equal to the comparative value of the particle number (No in S50-3), the image processing apparatus 100 selects the next candidate particle number (S50-4) and performs a comparison process S50-3 again. The next candidate particle number is the particle number of the next number and becomes Y++ (Y is incremented by 1). The image processing apparatus 100 repeats the process S50-3 and the process S50-4 until the cumulative weight of the candidate particle number becomes greater than or equal to the comparative value of the particle number.

When the cumulative weight of the candidate particle number is greater than or equal to the comparative value of the particle number (Yes in S50-3), the image processing apparatus 100 determines that the candidate particle number is the next particle number of the particle number (S50-5). The image processing apparatus 100 checks whether the particle number is the last (S50-6). When the particle number is not the last (there is still a particle a 0 next particle number of which has not been determined) (No in S50-6), the image processing apparatus 100 selects the next particle number (S50-7), and selects the candidate particle number 1 again (S50-2). The next particle number is the particle number of the next number and becomes X++.

For each of the particles, the image processing apparatus 100 detects the candidate number with which the cumulative weight of the candidate particle number is greater than or equal to the comparative value of the particle number and determines that the candidate number is the next particle number of the particle number.

When the particle number is the last (Yes in S50-6), the image processing apparatus 100 ends the process.

FIG. 7 illustrates an example of particle information and calculated values used in the resampling process S40. The image processing apparatus 100 performs the image analysis process, for example, with the number of samples set to 10.

Numbers (idx) of 1 to 10 are assigned to sample particles, respectively. The sequence of the particle numbers is, for example, a random sequence or a sequence in accordance with the positions of the particles.

The particle information includes information on the position such as the X coordinate (abscissa) and the Y coordinate (ordinate) in the image data of the particle to be used as the sample and the weight.

The cumulative weight is a numerical value obtained by adding the weights sequentially from the particle number 1. For example, in the particle number 4, 15 being a value obtained by adding the weights of the particle numbers 1 to 4 is the cumulative weight of the particle number 4.

The comparative value is a numerical value obtained by multiplying the average weight by the particle number. In other words, the comparative value is a numerical value obtained by accumulating the average weights sequentially from the particle number 1. For example, the comparative value of the particle number 3 is 17.1 obtained by multiplying the average of the weights of 5.7 by the particle number 3.

The resampling process S40 illustrated in FIG. 5 and the next-particle-number determination process S50 illustrated in FIG. 6 will be described with reference to the example illustrated in FIG. 7.

In the resampling process S40, the image processing apparatus 100 calculates the total of the weights of the ten sample particles (15+35+7=57) (S40-1 in FIG. 5).

The image processing apparatus 100 divides 57 being the total of the weights by 10 being the number of samples to calculate the average of the weights as 5.7 (S40-2 in FIG. 5).

The image processing apparatus 100 calculates the cumulative weight for each particle (S40-3 in FIG. 5). The image processing apparatus 100 calculates the cumulative weights of the particle numbers 1 to 3 as 0 by adding 0 being the weights of the particles. The image processing apparatus 100 calculates the cumulative weights of the particle number 4 as 15 by adding 15 being the weight of the particle number 4 to 0 being the cumulative weight of the particle number 3. Likewise, the image processing apparatus 100 calculates the cumulative weight of each of the particles up to the particle number 10.

The image processing apparatus 100 calculates the comparative value for each particle (S40-4 in FIG. 5). The image processing apparatus 100 calculates the comparative value of the particle number 1 as 5.7 by multiplying 5.7 being the average weight by 1 being the particle number. Likewise, the image processing apparatus 100 calculates the comparative value of each of the particles up to the particle number 10.

The image processing apparatus 100 executes the next-particle-number determination process S50. The image processing apparatus 100 selects the particle number 1 (S50-1 in FIG. 6) and selects the candidate particle number 1 (S50-2 in FIG. 6). Then, the image processing apparatus 100 determines that 0 being the cumulative weight of the candidate particle number 1 is not greater than or equal to 5.7 being the comparative value of the particle number 1 (No in S50-3 in FIG. 6) and selects the next candidate particle number 2 (S50-4 in FIG. 6). The image processing apparatus 100 determines that 0 being the cumulative weight of the candidate particle number 2 is not greater than or equal to 5.7 being the comparative value of the particle number 1 (No in S50-3 in FIG. 6) and selects the next candidate particle number 3 (S50-4 in FIG. 6). The image processing apparatus 100 determines that 0 being the cumulative weight of the candidate particle number 3 is not greater than or equal to 5.7 being the comparative value of the particle number 1 (No in S50-3 in FIG. 6) and selects the next candidate particle number 4 (S50-4 in FIG. 6).

The image processing apparatus 100 determines that 15 being the cumulative weight of the candidate particle number 4 is greater than or equal to 5.7 being the comparative value of the particle number 1 (Yes in S50-3 in FIG. 6) and determines that the candidate particle number 4 is the next particle number of the particle number 1 (S50-5 in FIG. 6).

The image processing apparatus 100 selects the next particle numbers (50-7 in FIG. 6) up to the last particle number 10 (50-6 in FIG. 6), repeats a determination process of the process S50-3, and determines the next particle number for each of the particle numbers (S50-5 in FIG. 6).

For the particle number 2, when 11.4 being the comparative value is compared with the cumulative weights sequentially from the cumulative weight of the particle number 1, the cumulative weight of the candidate particle number becomes greater than or equal to the comparative value of the particle number for the first time in comparison with 15 being the cumulative weight of the particle number 4. Thus, the particle number 4 becomes the next particle number. Likewise, the next particle numbers of the particle numbers 3 to 8 are 7, and the next particle numbers of the particle numbers 9 and 10 are 8.

When the next particle number is determined, in the resampling process S40, the image processing apparatus 100 sets the particle information corresponding to the next particle number as the particle information of each particle number (S40-5 in FIG. 5). Then, the image processing apparatus 100 ends the process.

Figure 8:
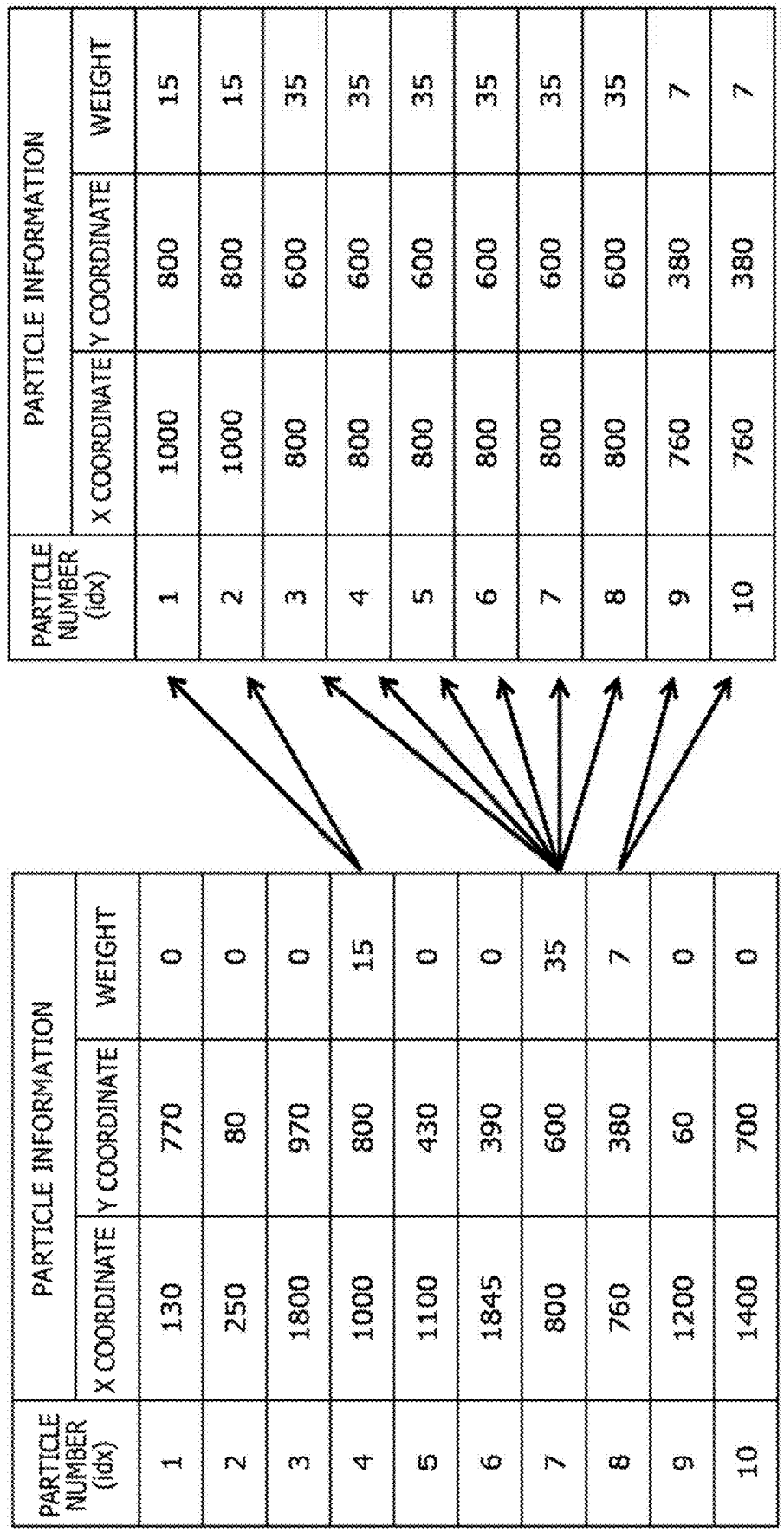
FIG. 8 illustrates an example of the particle information after the resampling process S40 has been executed.

FIG. 8 illustrates an example of the particle information after the resampling process S40 has been executed. The image processing apparatus 100 sets the particle information of each particle in accordance with, for example, the next particle number illustrated in FIG. 6. As the particle information of the particle number 1, information of the particle number 4 corresponding to the next particle number 4 (1000 being the X coordinate, 800 being the Y coordinate, and 15 being the weight) is set. Likewise, as the particle information of the particle numbers 2 to 10, information of the particle numbers corresponding to the next particle numbers is set.

The next prediction process S20 and the next measurement process S30 are executed by using the resampled particle information.

According to the first embodiment, in the resampling process, the image processing apparatus 100 is able to perform resampling without using a selector or a random number. This may reduce processing load of the image analysis process.

According to the first embodiment, the image processing apparatus 100 copies and uses the particle information of the next particle numbers as it is. However, the image processing apparatus 100 may use, for example, particle information around a particle corresponding to the next particle number. The particle information of the particle number 1 illustrated in FIG. 8 is the X coordinate of 1000 and the Y coordinate of 800. However, each coordinate may be shifted by a predetermined number or shifted by a numerical value such as a random number or a random function. By using, as the sample, a particle the coordinates of which are slightly moved, a new particle on which neither the prediction process S20 nor the measurement process S30 has been performed may be input. This may improve accuracy of the image analysis. It may be assumed that a particle at a position close to the particle of the next particle number has a weight close to the weight of the particle of the next particle number. Thus, a particle having a high weight may be used as a sample.

Second Embodiment

Next, a second embodiment will be described. According to the second embodiment, the resampling process S40 is executed by a circuit by using first-in, first-out (FIFO) queues. A circuit that performs the resampling process S40 may be referred to as a resampling circuit.

Figure 9:
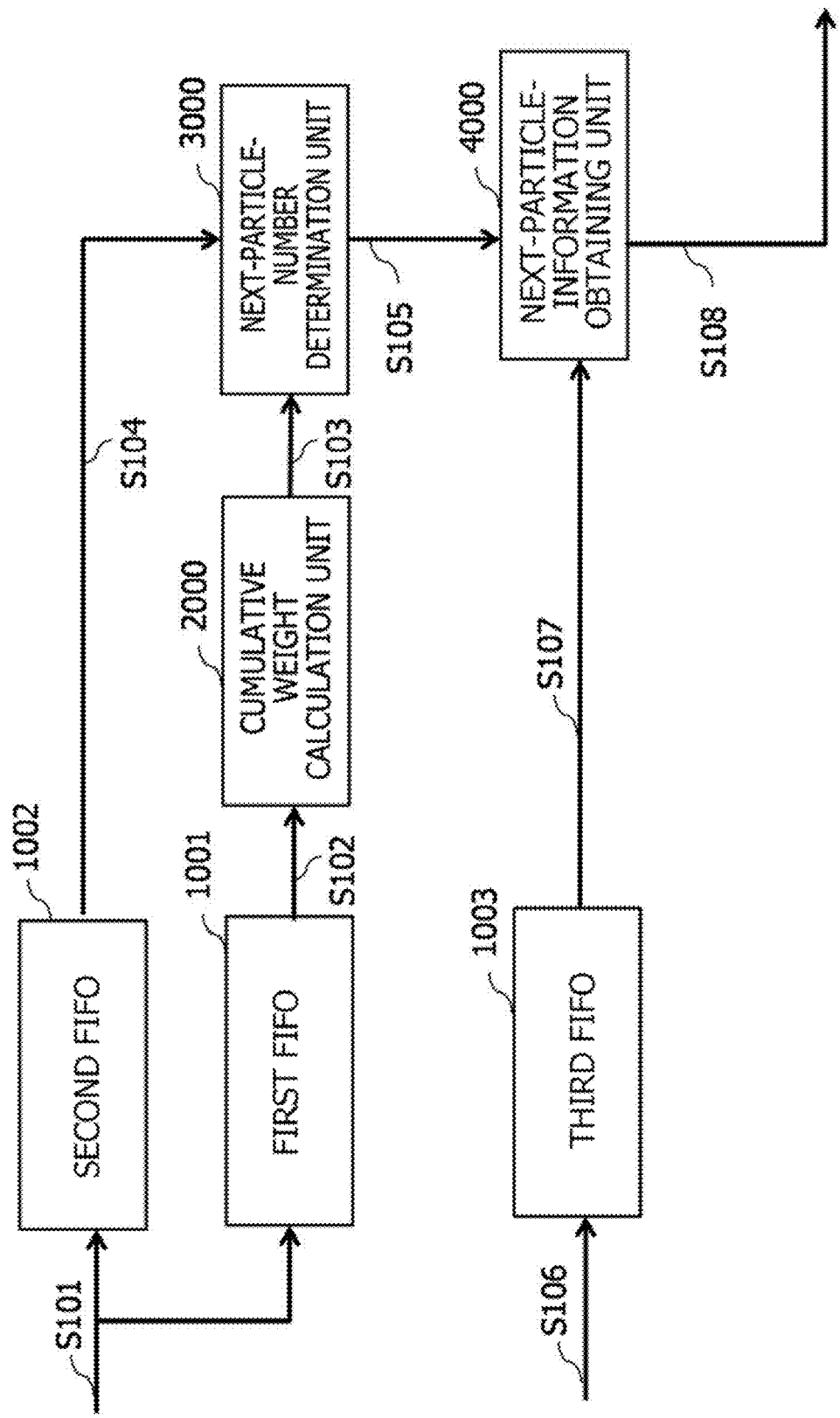
FIG. 9 illustrates an example of a resampling circuit.

FIG. 9 illustrates an example of the resampling circuit. The resampling circuit is included in, for example, the accelerator 150.

The resampling circuit includes a first FIFO 1001, a second FIFO 1002, a third FIFO 1003, a cumulative weight calculation unit 2000, a next-particle-number determination unit 3000, and a next-particle-information obtaining unit 4000.

Each of the FIFOs is a queue of a first-in, first-out method, and data is output in the sequence of input. For example, the particle information is input to the FIFOs in the sequence of particle numbers.

Information of the weight of the particles is input to the first FIFO 1001 and the second FIFO 1002 (S101). The information of the weight is included, for example, in the particle information.

The cumulative weight calculation unit 2000 is a processing unit that calculates the cumulative weight for each particle number. The process executed by the cumulative weight calculation unit 2000 is a process corresponding to the process S40-3 illustrated in FIG. 5.

The cumulative weight calculation unit 2000 extracts the information of the weight from the first FIFO 1001 sequentially from the particle number 1 (S102). The cumulative weight calculation unit 2000 extracts the weight of 0 of the particle number 1 and calculates the cumulative weight of 0 of the particle number 1. Next, the cumulative weight calculation unit 2000 extracts the weight of 0 of the particle number 2, adds this weight of 0 to the cumulative weight of 0 of the particle number 1, and calculates the cumulative weight of 0 of the particle number 2. The cumulative weight calculation unit 2000 performs a similar process also for the particle number 3 and calculates the cumulative weight of 0. Next, the cumulative weight calculation unit 2000 next extracts the weight of 15 of the particle number 4, adds this weight to the cumulative weight of 0 of the particle number 3, and calculates the cumulative weight of 15 of the particle number 2. After that, the cumulative weight calculation unit 2000 calculates the cumulative weights of the particle numbers 6 to 10.

The next-particle-number determination unit 3000 calculates the average of the weights of the particles, calculates the comparative value for each particle number, and determines the next particle number for each particle number. The process executed by the next-particle-number determination unit 3000 is a process corresponding to the process S40-1, the process S40-2, and the process S40-4 illustrated in FIG. 5 and the next-particle-number determination process S50 illustrated in FIG. 6.

The next-particle-number determination unit 3000 extracts the weights of all the particles from the second FIFO 1002 and calculates the total and the average of the weights. The next-particle-number determination unit 3000 calculates the comparative value for each particle number.

The next-particle-number determination unit 3000 determines the next particle number sequentially from the particle number 1. When determining the next particle number of a particle number X (X is a natural number), the next-particle-number determination unit 3000 obtains the cumulative weight of the particle number Y (Y is a natural number) from the cumulative weight calculation unit 2000 sequentially from the particle number 1. Here, the particle number Y corresponds to the candidate particle number illustrated in FIG. 6. When the cumulative weight of the particle number Y exceeds the comparative value of the particle number X, the next-particle-number determination unit 3000 determines that the particle number Y is the next particle number of the particle number X. The next-particle-number determination unit 3000 repeats the process and determines the next particle numbers of all the particle numbers.

The next-particle-number determination unit 3000 repeats the obtaining of the cumulative weight as many times as the number of the particles sequentially from the particle number 1. For example, regarding the cumulative weight for each particle number stored in the cumulative weight calculation unit 2000, the next-particle-number determination unit 3000 requests the cumulative weight calculation unit 2000 to transmit the stored cumulative weights every time the repeated process is performed. For example, the next-particle-number determination unit 3000 may obtain the cumulative weights from the cumulative weight calculation unit 2000, store the obtained values, and use the stored values.

The next-particle-number determination unit 3000 transmits the determined next particle number to the next-particle-information obtaining unit 4000 (S105).

The particle information is input to the third FIFO 1003 sequentially from the particle number 1.

The next-particle-information obtaining unit 4000 outputs the particle information that is to be used as the next sample in accordance with the next particle number (S108). The process executed by the next-particle-information obtaining unit 4000 is a process corresponding to the process S40-5 illustrated in FIG. 5.

The next-particle-information obtaining unit 4000 obtains the next particle numbers. According to FIG. 7, the next particle numbers are 4, 4, 7, 7, 7, 7, 7, 7, 8, 8 sequentially from particle number 1. The next-particle-information obtaining unit 4000 obtains the particle information from the third FIFO sequentially from the particle number 1 (S107). The next-particle-information obtaining unit 4000 discards the particle information of the particle numbers 1 to 3. Then, the next-particle-information obtaining unit 4000 obtains the particle information of the particle number 4 being the next particle number and outputs this particle information as the particle information for two particles (as the particle information of the two particles by copying) (S108). The next-particle-information obtaining unit 4000 discards the particle information of the particle numbers 5 and 6. The next-particle-information obtaining unit 4000 obtains the particle information of the particle number 7 being the next particle number and outputs this particle information as the particle information for six particles 0 (S108). Likewise, the next-particle-information obtaining unit 4000 outputs the particle information of the particle number 8 as the particle information for two particles (S108).

According to the second embodiment, the circuit for the resampling process may be configured without using a large-scale selector or a random number generation circuit. For example, when the resampling circuit is installed in the accelerator, neither a selector nor a random number generation circuit is used. Thus, the accelerator may be generated in a small size and at a low cost.

The above description is summarized as will be described below in the appendixes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus comprising:
a memory; and
a processor coupled to the memory, the processor being configured to perform processing of detecting an object by using a particle filter and by using a predetermined number of sample points referred to as particles, the processing including:
executing a detection processing configured to
calculate a weight for each of the particles in accordance with a likelihood of the particle, and
detect the object by using the calculated weights; and
executing a resampling processing configured to
assign a particle number to each of the predetermined number of particles such that the predetermined number of particles are assigned with the respective particle numbers sequentially from 1,
calculate, for each of the particles, a comparative value obtained by multiplying an average of the weights of the predetermined number of particles by the particle number,
calculate, for each of the particles, a cumulative weight obtained by adding the particle's own weight to the weights of all the particles assigned with the respective particle numbers smaller than the particle's own particle number, and
perform a reselection process that executes, on the particles of all the particle numbers, reselection which sets, as the particle after the reselection of the particle number of a first particle, a third particle assigned with a smallest particle number out of second particles the cumulative weights of which are greater than or equal to the comparative value of the first particle.

2. The image processing apparatus according to claim 1, the processing further comprising:
executing a control processing configured to repeat, in response that no object is detected by the detection processing, the reselection process by the resampling processing and the detecting of the object performed by the detection processing until the detection processing detects the object or the detection processing determines that the object is not imaged in image data.

3. The image processing apparatus according to claim 2, the processing further comprising:
executing an initial sampling processing configured to randomly select the predetermined number of particles from the image data before first execution of the detection processing.

4. The image processing apparatus according to claim 1, wherein
the processor executing the detection processing and the resampling processing is constructed by an accelerator circuit included in the image processing apparatus.

5. The image processing apparatus according to claim 1, wherein
the resampling processing is associated with a plurality of first-in, first-out (FIFO) queues, and wherein
particle information that includes information related to the weights of the predetermined number of particles and coordinates of the predetermined number of particles in image data is input to the FIFO queues in a sequence of the particle numbers.

6. The image processing apparatus according to claim 5, wherein
the resampling processing extracts the weights from a first first-in, first-out (FIFO) queue to calculate the comparative value, wherein
the resampling processing extracts the weights from a second FIFO queue to calculate the cumulative weight, and wherein
the resampling processing extracts the particle information of the particle of the reselected particle number from a third FIFO queue to output the particle information.

7. The image processing apparatus according to claim 6, wherein
the resampling processing discards the extracted particle information in response that the particle number of the particle information extracted from the third FIFO queue does not exist in the reselected particle numbers, and wherein
the resampling processing copies, in response that the particle number of the particle information extracted from the third FIFO queue exists in the reselected particle numbers, the particle information extracted from the third FIFO queue as many times as the number of the existing reselected particle numbers to output the copied particle information.

8. A non-transitory computer-readable storage medium storing a program which causes a processor to perform processing of detecting an object by using a particle filter and by using a predetermined number of sample points referred to as particles, the processing including:
executing a detection processing configured to
calculate a weight for each of the particles in accordance with a likelihood of the particle, and
detect the object by using the calculated weights; and
executing a resampling processing configured to
assign a particle number to each of the predetermined number of particles such that the predetermined number of particles are assigned with the respective particle numbers sequentially from 1,
calculate, for each of the particles, a comparative value obtained by multiplying an average of the weights of the predetermined number of particles by the particle number,
calculate, for each of the particles, a cumulative weight obtained by adding the particle's own weight to the weights of all the particles assigned with the respective particle numbers smaller than the particle's own particle number, and
perform a reselection process that executes, on the particles of all the particle numbers, reselection which sets, as the particle after the reselection of the particle number of a first particle, a third particle assigned with a smallest particle number out of second particles the cumulative weights of which are greater than or equal to the comparative value of the first particle.

* * * * *